United States Patent [19]
Rounds et al.

[11] Patent Number: 6,149,821
[45] Date of Patent: *Nov. 21, 2000

[54] BALANCED WATER PURIFICATION SYSTEM

[75] Inventors: Rhyta Sabina Rounds, Flemington; Tsui-Ling Hsu, Edison, both of N.J.

[73] Assignee: Advanced Water Technology, Inc., Aliso Viejo, Calif.

[*] Notice: This patent is subject to a terminal disclaimer.

[21] Appl. No.: 09/177,632

[22] Filed: Oct. 23, 1998

Related U.S. Application Data

[63] Continuation-in-part of application No. 09/079,269, May 15, 1998.

[51] Int. Cl.$^7$ .................................................. C02F 1/50
[52] U.S. Cl. .................. 210/754; 210/764; 210/169; 252/175; 422/37; 206/524.7
[58] Field of Search .................................. 210/764, 753, 210/754, 758, 759, 724, 169, 198.1; 422/28, 37; 252/175; 206/524.7

[56] References Cited

U.S. PATENT DOCUMENTS

| | | | |
|---|---|---|---|
| 4,014,676 | 3/1977 | Carter et al. | 71/67 |
| 4,552,752 | 11/1985 | Amick | 424/21 |
| 4,608,247 | 8/1986 | Heinig, Jr. | 424/16 |
| 4,780,216 | 10/1988 | Wojtowicz | 210/756 |
| 4,846,979 | 7/1989 | Hamilton | 201/754 |
| 4,935,116 | 6/1990 | LeMire | 204/237 |
| 5,223,149 | 6/1993 | Antelman | 210/764 |
| 5,332,511 | 7/1994 | Gay et al. | 210/755 |
| 5,352,369 | 10/1994 | Heinig, Jr. | 210/760 |
| 5,449,658 | 9/1995 | Unhoch et al. | 504/151 |
| 5,478,482 | 12/1995 | Jones et al. | 210/753 |
| 5,501,802 | 3/1996 | Thorp et al. | 210/758 |
| 5,514,287 | 5/1996 | Jones et al. | 210/753 |
| 5,527,506 | 6/1996 | Hamilton | 422/18 |
| 5,700,377 | 12/1997 | Cox | 210/724 |
| 6,054,056 | 4/2000 | Maziuk, Jr. et al. | 210/752 |

FOREIGN PATENT DOCUMENTS

| | | |
|---|---|---|
| 954754 | 6/1995 | South Africa . |
| 2305426 | 4/1997 | United Kingdom . |
| WO 95-23099 | 8/1995 | WIPO . |

*Primary Examiner*—David A. Simmons
*Assistant Examiner*—Frank M. Lawrence
*Attorney, Agent, or Firm*—Pennie & Edmonds LLP

[57] ABSTRACT

A balanced water purification system is provided with a buffer compound, and oxidizer/clarifier compound, and a biocide compound disposed in multiple packets such that the biocide compound and the oxidizer/clarifier compound are contained in different packets. The composition purifies and clarifies water while maintaining the existing water pH. The composition may also include a filtration aid, an algicide, a calcium releasing source, a chelator, and a sequestering agent.

20 Claims, No Drawings

BALANCED WATER PURIFICATION SYSTEM

This application is a continuation-in-part of copending application Ser. No. 09/079,269, filed May 15, 1998.

TECHNICAL FIELD

The present invention relates generally to chemical compositions used in the purification, clarification, and stabilization of water and waste water, methods for making the compositions, and methods for using the compositions. More specifically, the present invention relates to chemical compositions, methods for making the compositions, and methods for using the compositions in the purification, clarification, and stabilization of recreational waters such as swimming pool, spa, or hot-tub water.

BACKGROUND

The provision of safe and clean water is important in municipal, industrial, and recreational applications. Conventional water treatments employ physical, chemical, and biological processes either alone or in combination to produce a product water of acceptable quality.

In applications where water is intended for human contact or consumption, the water must be treated so that it is aesthetically pleasing in terms of taste, color, turbidity, odor, and pH, environmentally safe, and effectively free of pathogens and chemicals responsible for both acute and chronic illness. Conventional methods use chemicals as oxidizers, biocides, algicides, and pH buffers for the treatment of water and waste water. Typically, the chemicals are added to the water separately as part of an overall water maintenance or purification program. The water is monitored on an hourly, daily, or weekly basis, and when a particular treatment parameter is not acceptable or in compliance with regulatory levels, the appropriate amount of the necessary chemical is added. Often, treatment of one water quality parameter causes another water quality parameter to change. Conventional treatment, therefore, employs a continuous balancing process of monitoring water quality parameters and dosing with various chemicals to create and to maintain the appropriate water quality.

Combinations of two or more chemicals attempt to improve the ease and reliability of chemical treatments for clarifying or disinfecting water. For example, U.S. Pat. No. 5,501,802 to Thorpe et al. discloses a composition containing a polyhexamethylene biguanide sanitizer, persulfate salt oxidizers, and chelating agents. The composition is used to achieve water clarity. U.S. Pat. Nos. 5,514,287 and 5,478,482, both to Jones et al., disclose a composition and a method for controlling microbial growth in recirculating water systems. The composition includes a soluble boron contributor, a halogen/boron sanitizer/algicide, and an oxidizing clarifier having a chlorine compound, a non-halogen oxidizer, and a boron source. Finally, U.S. Pat. No. 4,846,979 to Hamilton discloses an algicide composition for treating swimming pools and spas including and alkali metal, alkaline earth metal or ammonium bromide and an oxidizer. The composition is metered in over time to maintain a desired bromine concentration. These chemical combinations are not complete water quality treatments. Further, the addition of these chemicals causes other water quality parameters to change, such as pH, requiring additional chemical treatment to compensate for the addition of these chemicals.

In other applications, for example swimming pools and spas, chemical combinations attempt to provide a complete water quality treatment. For example, U.S. Pat. No. 5,700,377 to Cox discloses a complete treatment for the purification of water in non-porous swimming pools, obviating the need for the addition of any other compounds to the water. The complete treatment chemical composition of Cox includes a peroxide compound, an ammonium-based biocidal compound, an acidic compound, a basic compound, a calcium-releasing basic compound, and EDTA. The composition is added to the water when the pH of that water is outside the human comfort zone of 7.2 to 7.6 in order to bring the pH within the zone range. Therefore, water clarification is combined with pH adjustment.

The need exists for a composition that acts as a biocide, oxidizer, clarifier, and algicide and does not interfere with the overall maintenance of the water. Since water conditions vary from application to application, the composition of the present invention is formulated to provide purification and clarification without adversely affecting concurrent treatment. Benefits include ease of operation for a consumer in pool or spa applications, decreased costs to industry in terms of chemicals and training and time in an industrial process or waste application, and decreased costs to municipal water supplies with limited budgets, space, and equipment. The present composition and treatment method is useful in a variety of applications including home water treatment, community water treatment, industrial water treatment (both waste water and process water), agriculture, water reuse, groundwater injection, and recreational water applications.

SUMMARY OF THE INVENTION

In accordance with the present invention, applicants have discovered compositions and a method for making the compositions to purify water while maintaining the desired water balance upon the addition of the composition to water. In addition, applicants have discovered a system for packaging and storing the composition.

When added to water independently maintained at a predetermined pH and having a certain temperature range, the compositions do not change the pH of the water. The compositions include a buffer compound having an acidic component and a basic component, the acidic and basic components being present in amounts such that the molar ratio of the acidic component to the basic component yields a buffer compound whose pH in solution corresponds to the predetermined pH of the water to be purified, a biocide compound present in an amount sufficient to inactivate the microorganisms in the water to be purified, and an oxidizer/clarifier compound present in an amount sufficient to oxidize the biocide precursor completely. The acidic component includes, but is not limited to, sodium bisulfate. The basic component includes, but is not limited to, sodium bicarbonate and sodium carbonate.

In one formulation of the compositions, the acidic component is sodium bisulfate, the basic component is sodium bicarbonate and the molar ratio of sodium bisulfate to sodium bicarbonate is about 0.26 to about 0.14, corresponding to a buffer compound pH in solution from about 6.8 up to about 7.2. In another formulation, the acidic component is sodium bisulfate, the basic component is sodium bicarbonate, and the molar ratio of sodium bisulfate to sodium bicarbonate is about 0.18, corresponding to a buffer compound pH in solution of about 7.

In terms of weight percents, the acidic component can be present in the compositions from about 1.6 up to about 21 weight percent and the basic component is present in the composition from about 3 up to about 28 weight percent.

This is true, for example, when the acidic component is sodium bisulfate, the basic component is sodium bicarbonate and the weight ratio of sodium bisulfate to sodium bicarbonate is about 0.27. Alternatively, the acidic component is present in the composition from about 6 up to about 20.6 weight percent and the basic component is present in the composition from about 4.5 up to about 15.4 weight percent. In this case, the acidic component is sodium bisulfate, the basic component is sodium carbonate and the weight ratio of sodium bisulfate to sodium carbonate is about 1.34.

In other formulations, the weight ratio of the acidic component to the basic component compensates for an increase in the pH of the water over time associated with water systems exposed to the atmosphere. For example, the acidic component can be sodium bisulfate, the basic component sodium bicarbonate, and the weight ratio of sodium bisulfate to sodium bicarbonate about 1.5 to yield a buffer pH of about 4. Alternatively, the acidic component can be sodium bisulfate, the basic component sodium carbonate, and the weight ratio of sodium bisulfate to sodium carbonate about 2.27.

The biocide compound can be $Cl_2$, $Br_2$, $I_2$, alkali metal hypochlorite, alkaline earth metal hypochlorite, chlorinated isocyanurates, PHMB (poly(hexamethylene biguanide) hydrochloride), or halogenated hydantoins. Preferably, the biocide compound is a halide salt of ammonium or sodium, specifically ammonium chloride, ammonium bromide, or sodium bromide. The biocide compound can be present in the composition in an amount from about 18 up to about 35 weight percent.

The oxidizer/clarifier compound includes a peroxide, potassium monopersulfate, alkali metal perborate, or alkali metal persulfate. Preferably, the oxidizer/clarifier compound is sodium persulfate or potassium persulfate. The oxidizer/clarifier compound can be present in the composition in an amount from about 38 up to about 64 weight percent. In one formulation, the oxidizer/clarifier compound is present in an amount sufficient to oxidize the biocide compound completely and to oxidize organic contaminants in the water to be purified. In this case, the molar ratio of the oxidizer/clarifier compound to the biocide precursor is greater than about 1.

In terms of concentration in the water, the oxidizer/clarifier compound is present in the composition in an amount such that when the composition is added to water the concentration of the oxidizer/clarifier compound in the water is from about 2 up to about 9 parts per million. Preferably, the concentration of the oxidizer/clarifier in the water is about 5 ppm.

In one formulation, the biocide precursor is ammonium chloride and is present in the composition from about 18 up to about 23 weight percent. The oxidizer/clarifier compound is sodium persulfate and is present in the composition from about 50 up to 64 weight percent, and the weight ratio of sodium persulfate to ammonium chloride is about 2.8. In another formulation, the biocide compound is sodium bromide and is present from about 25 up to about 35 weight percent. The oxidizer/clarifier compound is sodium persulfate and is present from about 38 up to about 52 weight percent, and the weight ratio of sodium persulfate to sodium bromide is about 1.48.

The balanced water purification composition may include additional compounds including an algicide. The algicide includes copper sulphate, copper citrate, copper EDTA (ethylene diaminetetraacetic acid), copper gluconate, silver nitrate, colloidal silver, silver metal deposit on aluminum, quaternary (quats) or polyquaternary (polyquats) ammonium compounds (e.g. poly[oxyethylene (dimethylimino) ethylene (dimethylimino) ethylene dichloride]), sodium dimethyldithiocarbamate, 2-chloro-4,6-bis(ethylamino)-5-triazine, zinc chloride, or zinc oxides. In one formulation, the algicide is copper sulphate and is present from about 1 up to about 2 weight percent. In another formulation, the algicide is copper citrate and is present from about 1.5 up to about 2 weight percent. The copper citrate can be formed in-situ by combining copper sulphate and sodium citrate in the composition in about a 1 to 1 molar ratio.

The balanced water purification composition may also include one or more of a chelating agent such as EDTA acid present from about 4.5 up to about 14.5 weight percent, phosphates, organic phosphonates, polyphosphonates, alkali metal EDTA, EDTA salts such as di-sodium EDTA, or citric acid, a filtration aid such as aluminum sulphate from about 1 up to about 4 weight percent, a calcium releasing compound, a scale inhibitor, and a sequestering agent.

In one formulation of the balanced water purification composition, the acidic component is sodium bisulfate and is present in an amount from about 1.6 to about 6.1 weight percent. The basic component is sodium bicarbonate present in an amount from about 5.9 to about 22.4 weight percent. The weight ratio of sodium bisulfate to sodium bicarbonate is about 0.27. The biocide compound is ammonium chloride and is present in an amount from about 18 up to about 23 weight percent. The oxidizer/clarifier compound is sodium persulfate present in an amount from about 50 to about 64 weight percent, and the weight ratio of sodium persulfate to ammonium chloride is about 2.8. This formulation may also include copper sulphate in an amount from about 1 up to about 2 weight percent.

In another formulation of the balanced water purification composition, the acidic component is sodium bisulfate and is present in an amount from about 2.7 up to about 7.6 weight percent. The basic component is sodium bicarbonate and is present in an amount from about 10 up to about 28 weight percent. The weight ratio of sodium bisulfate to sodium bicarbonate is about 0.27. The biocide compound is sodium bromide present in amount from about 25 up to about 35 weight percent. The oxidizer/clarifier compound is sodium persulfate present in an amount from about 38 up to about 52 weight percent, and the weight ratio of sodium persulfate to sodium bromide is about 1.48. This formulation may also include copper sulfate present from about 1 up to about 2 weight percent or copper citrate from about 1 up to about 2 weight percent.

The balanced water purification composition includes a water soluble film bag for holding a predetermined amount of the compositions. The water soluble film bag includes polyvinyl alcohol (PVOH), a cellulosic polymer, or polyethylene oxide.

The method for making the balanced water purification composition to be used in conjunction with existing water treatment without affecting the pH of the water includes determining the pH and temperature range of the water to be treated, formulating a buffer compound having an acidic component and a basic component present in a molar ratio corresponding to the pH of the water to be treated, adding a sufficient amount of a biocide compound to inactivate the biological contaminants in the water, and adding a sufficient amount of a clarifier/oxidizer compound to oxidize the biocide precursor completely and to oxidize organic contaminants in the water. This method of making also includes adding a predetermined amount of the composition to a water soluble film or laminated film bag, where the water soluble film bag includes polyvinyl alcohol, a cellulosic fiber, polyethylene oxide, or laminates thereof. The balanced water purification composition can be used in purifying and clarifying recreational waters.

The composition can be packaged into a system including a plurality of packets. In one embodiment, no one of the plurality of packets comprises all of the compounds of the composition. However, when combined, the plurality of packets will comprise the entire composition. In another embodiment, the biocide compound and the oxidizer/clarifier compound are held in different packets. The plurality of packets can include a first packet having the biocide compound and a second packet having the oxidizer compound. The first packet may also include the basic component of the buffer compound, and the second packet may also include the acidic component of the buffer compound. The plurality of packets may include exactly two packets, and the packets may be water soluble film bags.

In making the balanced water treatment system of the present invention, the balanced water treatment composition is placed in the plurality of bags as described above following the formulation of the composition.

DETAILED DESCRIPTION OF THE INVENTION

The composition of the present invention includes an oxidizer/clarifier compound, a biocide compound, and a buffer compound. The buffer compound includes an acidic component and a basic component. The composition is typically made from inorganic salts. Generally, these salts dissociate upon addition to water, affecting water balance including pH, total alkalinity, and hardness. The composition of the present invention, however, is formulated to provide water clarification and purification in conjunction with an existing overall water maintenance program without adversely affecting other water quality parameters. Therefore, given a predetermined water pH and water temperature range, the molar ratios of the compounds and components of the composition of the present invention are calculated from their dissociation constants to yield a pH in solution equivalent to the predetermined pH of the water to be treated. The calculated molar ratios are used to determine the weight percent ratios of the components (i.e. molar ratios of dissociated species determine the weight ratios of compounds and the components). Therefore, water balance is maintained when the composition so formulated is added to the water.

The buffer compound is formulated to have a pH in solution corresponding to the pH of the water to be treated. Therefore, the type and weight percent of the acidic component and the basic component of the buffer compound are selected to provide the desired pH at the appropriate water temperature. The basic component includes, but is not limited to, sodium bicarbonate and sodium carbonate. The acidic component includes, but is not limited to sodium bisulfate. Typically, the buffer compound includes sodium bisulfate and at least one of sodium bicarbonate and sodium carbonate. The buffer compound may also include phosphates such as monopotassium phosphate, monobasic sodium phosphates, and citrate-phosphate blends.

In order to achieve the desired buffer solution pH, the molar ratio of the acidic component to the basic component is calculated. Calculation of the molar ratio is governed by the following reactions describing the carbonate system and showing the generation of bicarbonate and carbonate ions respectively:

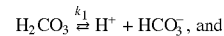

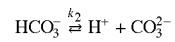

where $k_1$ and $k_2$ are the dissociation constants. Given a desired pH of the water at a given temperature, the molar ratios can be determined. By way of illustration, using a sodium bicarbonate basic component at a pH of about 7 and a water temperature of about 25° C., the dissociation constants are $k_1=4.45\times10^{-7}$, and $k_2=4.7\times10^{-11}$. Solving the equation:

$$pH = pKa_1 + \log([HCO_3^-]/[H_2CO_3])$$

yields a molar ratio after equilibrium of the basic form ($HCO_3^-$) to the acidic form ($H_2CO_3$) of 4.45. To convert the basic form to the acidic form, an appropriate amount of a proton donor, for example, sodium bisulfate ($NaHSO_4$), is combined with sodium bicarbonate. The formation of 1 equivalent of the acidic form will require 1 equivalent of sodium bisulfate. Given the molar ratio at equilibrium of the basic and acidic forms, the initial molar ratio of the combination of sodium bisulfate to sodium bicarbonate for generation of the amount of the acidic form required at pH 7 is about 0.18.

In general, for a buffer compound utilizing sodium bisulfate, sodium bicarbonate, or sodium carbonate in water having a temperature from about 20° C. up to about 30° C. and a pH from a pH of about 4 up to a pH of about 10 the following molar ratios apply. For a pH of 4, the initial molar ratio of sodium bisulfate to sodium bicarbonate is about 1. At this pH, no sodium carbonate is required. As the pH increases to about 8.3, this molar ratio decreases until only sodium bicarbonate is required at a pH of about 8.3. Above a pH of 8.3, sodium carbonate is required in addition to sodium bicarbonate. As the pH increases from about 8.3 up to about 10, the initial ratio of sodium carbonate to sodium bicarbonate increases up to about 0.47. In one embodiment, the buffer compound includes sodium bisulfate as the acidic component, sodium bicarbonate as the basic component, a water temperature range from about 20° C. up to about 30° C., and an initial molar ratio of sodium bisulfate to sodium bicarbonate from about 0.26 for a pH of about 6.8 to a molar ratio of about 0.14 for a pH of about 7.2.

After the acidic and basic components are selected and their molar ratios are calculated based upon pH and temperature, the initial molar ratios are converted to weight percent ratios based upon the molecular weights of the components. In one embodiment, the acidic component is sodium bisulfate, the basic component is sodium bicarbonate, and the weight ratio of sodium bisulfate to sodium bicarbonate is about 0.27, corresponding to a pH of about 7. This embodiment is useful for recreational water applications such as swimming pool water. In another embodiment, the acidic component is sodium bisulfate, the basic component is sodium carbonate, and the weight percent ratio of the sodium bisulfate to the sodium carbonate is about 1.34, also corresponding to a pH of about 7. Although the buffer compound in the preceding embodiments has enough buffering capacity to assist in maintaining the pH of the water over time and to account for changes in the pH of the water due to the addition of other chemicals, the pH in a water system that is open to the atmosphere will tend to increase over time. Therefore, an acidic variant of the buffer compound can be specifically formulated to compensate for this increase. In one embodiment of the acidic variant, the acidic component is sodium bisulfate, the basic component is sodium bicarbonate, and the weight ratio of sodium bisulfate to sodium bicarbonate is about 1.5, corresponding to a pH of about 4. In another embodiment of the acidic variant, the acidic component is sodium bisulfate, the basic component is sodium bicarbonate, and the weight ratio of sodium bisulfate to sodium bicarbonate is about 3.1, corresponding to a pH of about 2.78. In yet another embodiment of the acidic variant, the acidic component is sodium bisulfate, the basic component is sodium carbonate and the weight ratio of sodium bisulfate to sodium carbonate is 2.27, corresponding to a pH of about 4. Similarly, the buffer compound can be formulated as a basic variant. In one embodiment of the basic variant, the acidic component is sodium bisulfate, the basic component is sodium carbonate and the weight ratio of sodium bisulfate to sodium carbonate is about 0.77, corresponding to a pH of about 10.

Finally, the weight percents for each component in the buffer compound are expressed in ranges based upon the possible maximum and minimum amounts of the other compounds in the composition. In one embodiment, the acidic component is sodium bisulfate, the basic component is sodium bicarbonate, the sodium bisulfate is present from about 1.6 up to about 21 weight percent, and the sodium bicarbonate is present from about 3 up to about 28 weight percent. In another embodiment, the acidic component is sodium bisulfate, the basic component is sodium carbonate, the sodium bisulfate is present form about 6.0 up to about 20.6 weight percent, and the sodium carbonate is present from about 4.5 up to about 15.4 weight percent.

The biocide compound is selected to provide chemical inactivation of the biological or microbiological contaminants in the water. The biocide compound includes $Cl_2$ (gas), $Br_2$, $I_2$, alkali metal and alkaline earth metal hypochlorite (e.g. LiOCl, NaOCl, and $Ca(OCl)_2$), chlorinated isocyanurates, PHMB(poly(hexamethylene biguanide) hydrochloride), or halogenated hydantoins. In a preferred embodiment the biocide compound is added as a halide salt of ammonium or sodium. In a more preferred embodiment, the biocide compound is ammonium chloride. In a most preferred embodiment, the biocide compound is sodium bromide or ammonium bromide. Bromide is preferred over chloride because of health concerns over chlorinated by-products, and because bromine is not as pH sensitive as chlorine, bromine causes less eye irritation. Odor formation is reduced when using bromide, and bromamines have a much greater biocidal efficiency than chloramines.

The biocide compound is present in an amount necessary to inactivate the biological contaminants, including bacteria, viruses, and protozoa, and to maintain a biocide residual in the water necessary to meet regulatory requirements, to prevent regrowth of the biological contaminants, or to inactivate biological contaminants subsequently introduced into the water. The biocide compound is present in the composition in an amount from about 18 up to about 35 weight percent. In one embodiment, the biocide compound is ammonium chloride and is present in the composition in an amount from about 18 up to about 23 weight percent. Although ammonium chloride is a weak acid salt, the conjugate base is not present. Therefore, ammonium chloride does not act as a buffer nor does it affect the buffer pH. In a preferred embodiment, the biocide compound is sodium bromide and is present in the composition from about 25 up to about 35 weight percent.

The oxidizer/clarifier compound is added to oxidize organic matter in the water and to oxidize the biocide compound, for example oxidizing chloride to chlorine and bromide to bromine. The oxidizer/clarifier compound includes peroxides, hydrogen peroxide, potassium monopersulfate, and alkali metal perborate. In a preferred embodiment, the oxidizer/clarifier compound is an alkali metal persulfate. In a more preferred embodiment, the alkali metal persulfate is sodium persulfate or potassium persulfate. In a most preferred embodiment, the alkali metal persulfate is sodium persulfate.

The oxidizer/clarifier compound is present in an amount necessary to oxidize the organic matter present in the water, to oxidize the biocide precursor compound completely, and to maintain a oxidizer/clarifier residual in the water necessary to oxidize any organic material that may be subsequently introduced into the water. In one embodiment, the oxidizer/clarifier compound is present in the composition in an amount from about 38 weight percent up to about 64 weight percent. In another embodiment, the oxidizer/clarifier compound is present on the composition in an amount from about 50 up to about 64 weight percent. In yet another embodiment, the oxidizer clarifier compound is present in the composition in an amount from about 38 up to about 52 weight percent. In a preferred embodiment, the oxidizer/clarifier compound is present in the composition in an amount sufficient to achieve a concentration in the water of the oxidizer/clarifier compound from about 2 up to about 9 parts per million (ppm). In a more preferred embodiment, the oxidizer/clarifier compound is present in the composition in an amount sufficient to achieve a concentration in the water of the oxidizer/clarifier compound of about 5 ppm.

In order for the oxidizer/clarifier compound to oxidize the biocide compound, the amount of the oxidizer/clarifier compound in the composition is selected to be more than that of the biocide compound in the composition. The molar ratio of the oxidizer/clarifier compound to the biocide compound is formulated to be at least 1 to 1 with any excess persulfate oxidizing the organic matter present in the water. By way of example, assume the conversion of chloride to chlorine by persulfate is governed by the reaction:

$$S_2O_8^{2-} + 2Cl^- \rightarrow 2SO_4^{2-} Cl_2, \ E^o = 0.7V.$$

In order to have a sufficient amount of persulfate to oxidize the biocide and the organic matter, the persulfate to chlorine ratio $(S_2O_8^{2-}/Cl_2)$ is greater than 1:1 in the water, for example, about 1 to 0.8, is selected, yielding a molar ratio of persulfate to chloride $(S_2O_8^{2-}/Cl^-)$ in the composition of about 1 to 1.6. This yields a weight ratio of sodium persulfate to ammonium chloride in the composition of about 2.8. In a preferred embodiment, the oxidizer/clarifier is sodium persulfate, the biocide is ammonium chloride, and the weight ratio of sodium persulfate to ammonium chloride is about 2.8. In a more preferred embodiment, the oxidizer/clarifier is sodium persulfate, the biocide is sodium bromide, and the weight ratio of sodium persulfate to sodium bromide is 1.48.

Although not required in the composition of the present invention to provide purification, disinfection, and clarification without adversely affecting the existing water balance, additional compounds may be added to the composition of the present invention in response to application specific water quality demands. These additional compounds include algicides, calcium releasing compounds, chelators, scale inhibitors, sequestering agents, and filtration aids (i.e. coagulants and flocculants).

In applications where algae growth is a concern, an algicide compound may be added to control the growth of the algae. This is true, for example, of applications exposed to the environment. The algicide compound includes metal complexes such as copper sulphate, copper citrate, copper EDTA, and copper gluconate, silver nitrate, colloidal silver, silver metal deposits on aluminum, polyquats such as poly [oxyethylene (dimethylimino) ethylene (dimethylimino) ethylene dichloride], quats, sodium dimethyldithiocarbamate, and 2-chloro-4,6-bis(thylamino)-5-triazine, and zinc compounds such as zinc chloride and zinc oxides. In a preferred embodiment, the algicide is copper sulfate. In a more preferred embodiment, the algicide is copper citrate. In a most preferred embodiment, the copper citrate is formed in-situ by combining copper sulfate and sodium citrate together in the composition in a 1:1 molar ratio. The algicide is present in the composition in an amount from about 1 weight percent up to about 2 weight percent.

Although calcium maintenance is not required for the application of the present invention, calcium chloride can be added to the composition to maintain water hardness in the range of from about 150 up to about 400 ppm. The chelators include EDTA acid, EDTA metal salts such as sodium salts (disodium, trisodium, and tetrasodium salts), citric acid, sodium citrate, phosphates, organic phosphonates, organic polyphosphonates. The chelators are present in an amount from about 2.5 up to about 18.5 weight percent. In one embodiment, the chelating agent is EDTA acid and is present from about 4.5 to about 14.5 weight percent. In another embodiment, the chelating agent is disodium EDTA salt and is present from about 2.5 up to about 18.5 weight percent. In a preferred embodiment, the chelating agent is EDTA acid and is present in an amount of about 11 weight percent. The scale inhibitors and sequestering agents include polyacrylates (polyacrylic acid), polycarboxylate, polymaleic acid, tartaric acid, glycolic acid, and polyglycolic acid. In a preferred embodiment, the scale inhibitors are polyacrylate scale inhibitors. The scale inhibitors and sequestering compounds are formulated to be present in the treated water in an amount from about 25 up to about 200 ppm. The filtration aids include inorganic coagulants including the salts of aluminum and ferric ions such as aluminum sulphate, ferric sulphate, lime (CaO), glycolic acid, organic coagulants such as organic polymers (often termed polyelectrolytes) including both natural and synthetic, nonionic, anionic, and cationic polymers. In one embodiment, the filtration aid is a low molecular weight polyacrylate. In another embodiment, the filtration aid is aluminum sulfate and is present in an amount from about 1 to about 4 weight percent.

In order to formulate the composition of the present invention, the desired water quality for the particular application is determined. The acidic and basic components are selected, and based upon the pH and temperature of the water, the molar ratio of the acidic component to the basic component of the buffer compound is calculated. This molar ratio yields a working weight percent range for the buffer compound to use in the formulation of the composition. The amount of the selected biocide compound is calculated based upon the anticipated biocide demand in the water and any required or desired biocide residual in the water. Next, the molar ratio of the desired oxidizer/clarifier compound to the biocide compound is calculated to provide a molar excess of the oxidizer/clarifier compound to the biocide compound sufficient to oxidize the biocide completely and to meet the oxidant demand of the organic matter in the water. Based upon this molar ratio, the weight percents of oxidizer/clarifier and biocide are calculated from their molecular weights. The weight ratios of the acidic component, basic component, biocide compound, and oxidizer/clarifier compound are maximized and minimized within working ranges of efficacy to yield weight percent ranges for each constituent in a particular embodiment of the composition. Finally, additional chemical compounds such as algicides, calcium releasing compounds, chelators, scale inhibitors, sequestering agents, and filtration aids are added to the composition based upon the needs of the water in the specific application. Once formulated, the composition is packaged to permit easy and reliable addition into the water to be treated. The packaging includes bulk powders, aqueous solutions, tablets, or packets.

In one embodiment, the composition is packaged in soluble film pouches or packets. Soluble pouches provide ease of use, consistency of dose, minimal hazard to the user, and minimal packaging waste. The soluble pouch is made from polymers, including polyvinyl alcohol, cellulosic polymers, and polyethylene oxide. In a preferred embodiment, the soluble pouch is made from polyvinyl alcohol. The pouch may contain enough composition to make a slurry or solution for metering into the water or may be sized for addition directly into the water to be treated. The direct addition size contains a sufficient amount of the composition such that all the compounds are present in the water in the desired concentrations upon addition of a single packet or multiple packets to the water. The direct addition size is ideal for swimming pool and spa applications.

When multiple packets are used, the contents of each packet can be varied. In one embodiment, each packet includes the entire balanced water treatment composition. In a preferred embodiment, each packet includes at least one of the various compounds and components that constitute the composition. In this embodiment, a composition in accordance with this invention is contained in and formed by the combination of at least two packets, a first packet and a second packet. This combination may occur during the manufacturing of the compound, close to but prior to the time of addition to the water to be treated, or upon addition to the water to be treated. In one embodiment, the multiple packets are individual, separate packets. In another embodiment, the multiple packets are individual packets attached to one another, for example, by perforations. In yet another embodiment, the multiple packets are arranged as compartments within a larger single exterior packet.

The use of multiple packets provides benefits in the manufacture, storage, and use of the balanced water purification composition. The use of multiple packets to contain various sub-combinations of the compounds provides modularity and efficiency in the manufacturing process. Further, by separating into different packets compounds that have the potential for undesirable reactions during storage, resulting in the production of hazardous gases, the composition can be stored more safely and reliably for longer periods of time. The availability of multiple packets containing various combinations or sub-combinations of the compounds gives the end user the ability to customize water treatment, immediately before or directly upon addition of the composition to the water.

Any number of packets are possible in the multiple packet system, such as one packet for each of the compounds and components in the composition or various packets containing sub-combinations of the compounds and components. In one embodiment, the composition is contained in at least two packets such that the biocide compounds and the oxidizer/clarifier compounds are contained in separate packages. In a preferred embodiment, the packet containing the biocide compound also includes the basic component of the buffer compound. In a more preferred embodiment, the multiple packets include two packets, the first packet including the biocide compound and the basic component of the buffer compound and the second packet containing the oxidizer/clarifier compound, the acidic component of the buffer compound, and any additional compound. Alternatively, additional inert additives, such a sodium citrate, EDTA sodium salts, or basic alkali metal salts of phosphates may be included in the first packet containing the biocide compound. Alternatively, the second packet may include citric acid, EDTA, or acidic alkali metal salts of phosphates. Although multiple packets in accordance with the present invention can be used for any chemical composition, the preferred embodiment includes balanced water treatment compositions formulated in accordance with the present invention.

EXAMPLES

Various formulations of the present composition are possible for recreational water applications such as swimming pools and spas. These applications typically have a pH of 7.2 to 7.6, total alkalinity of 50 to 150 ppm, a hardness of 150 to 400 ppm, and a water temperature of 20 to 30° C. The composition is formulated based upon these water conditions such that the pH of the water will not be affected upon addition of the composition. Numerous proposed formulations are illustrated in the following examples.

Example 1

| Component | Weight Percent Range |
| --- | --- |
| Sodium Persulfate | 50–61.3 |
| Ammonium Chloride | 18–22 |
| Sodium Bisulfate | 2.2–5.5 |
| Sodium Bicarbonate | 8–20 |
| EDTA | 4.5–14.5 |
| Aluminum Sulphate | 1–4 |
| Copper Sulphate | 1–2 |

The weight ratio of sodium bisulfate to sodium bicarbonate is 0.27, and the weight ratio of sodium persulfate to ammonium chloride is 2.8. The persulfate/chloride, bisulfate/bicarbonate pair ratios are based upon a pH of about 7.

Example 2

| Component | Weight Percent Range |
| --- | --- |
| Sodium Persulfate | 50–63 |
| Ammonium Chloride | 18–22.5 |
| Sodium Bisulfate | 1.6–5.3 |
| Sodium Bicarbonate | 5.9–19.7 |
| Disodium EDTA Salt | 5–18.5 |
| Aluminum Sulphate | 1.0–4.0 |
| Copper Sulphate | 1.0–2.0 |

Again, the weight ratio of sodium bisulfate to sodium bicarbonate is 0.27, and the weight ratio of sodium persulfate to ammonium chloride is 2.8. Disodium EDTA salt is substituted for EDTA acid as the chelating agent.

Example 3

| Component | Weight Percent Range |
| --- | --- |
| Sodium Persulfate | 50–63 |
| Ammonium Chloride | 18–22.5 |
| Sodium Bisulfate | 1.6–6.1 |
| Sodium Bicarbonate | 5.9–22.4 |
| Disodium EDTA Salt | 2.5–5 |
| Copper Sulphate | 1–2 |

In this example, aluminum sulfate is not added, and disodium EDTA salt is again substituted as the chelating agent. The sodium bisulfate to sodium bicarbonate and sodium persulfate to ammonium chloride weight ratios remain 0.27 and 2.8 respectively.

Example 4

| Component | Weight Percent Range |
| --- | --- |
| Sodium Persulfate | 50–61 |
| Ammonium Chloride | 18–22 |
| Sodium Bisulfate | 6–15.3 |
| Sodium Bicarbonate | 4–10.2 |
| EDTA | 4.5–14.5 |
| Aluminum Sulphate | 1–4 |
| Copper Sulphate | 1–2 |

In this example the persulfate/chloride weight ratio is again 2.8; however, the bisulfate/bicarbonate weight ratio is increased to 1.5. This acidic variant of the composition is intended to compensate for a water system that is open to the environment causing the pH to increase over time. The acidic variant controls a pH rise that is greater than the buffering capacity of the variant in Example 1. The acid/base dissociation pairs are formulated based upon a pH of about 4.

Example 5

| Component | Weight Percent Range |
| --- | --- |
| Sodium Persulfate | 50–63 |
| Ammonium Chloride | 18–22.5 |
| Sodium Bisulfate | 4.5–15 |
| Sodium Bicarbonate | 3–10 |
| Disodium EDTA salt | 5–18.5 |
| Aluminum Sulfate | 1–4 |
| Copper Sulfate | 1–2 |

Again, the persulfate/chloride weight ratio is 2.8, and the bisulfate/bicarbonate weight ratio is 1.5. Disodium EDTA salt is substituted for EDTA acid as the chelating agent.

Example 6

| Component | Weight Percent Range |
| --- | --- |
| Sodium Persulfate | 50–63 |
| Ammonium Chloride | 18–22.5 |
| Sodium Bisulfate | 4.5–17.1 |

-continued

| Component | Weight Percent Range |
| --- | --- |
| Sodium Bicarbonate | 3–11.4 |
| Disodium EDTA salt | 2.5–5 |
| Copper Sulfate | 1–2 |

In this example, aluminum sulfate is not added, and disodium EDTA salt is again substituted as the chelating agent. The persulfate/chloride and bisulfate/bicarbonate weight ratios remain 2.8 and 1.5 respectively.

Example 7

| Component | Weight Percent Range |
| --- | --- |
| Sodium Persulfate | 56–64 |
| Ammonium Chloride | 20–23 |
| Sodium Bisulfate | 2.4–4.6 |
| Sodium Bicarbonate | 9–17 |
| Copper Sulphate | 1–2 |

The specific weight percents are chosen such that the sodium bisulfate to sodium bicarbonate weight ratio is 0.27, and the weight ratio of sodium persulfate to ammonium chloride is 2.8. This formulation is preferred for waters where metals are not problematic and filtration aids are not required but where algae growth is a concern. The variant of this example is based upon a pH of about 7.

Example 8

| Component | Weight Percent Range |
| --- | --- |
| Sodium Persulfate | 56–64 |
| Ammonium Chloride | 20–23 |
| Sodium Bisulfate | 6.9–13 |
| Sodium Bicarbonate | 4.6–8.6 |
| Copper Sulfate | 1–2 |

The specific weight percents are chosen such that the sodium bisulfate to sodium bicarbonate weight ratio is 1.5, and the weight ratio of sodium persulfate to ammonium chloride is 2.8. This is the acidic variant of Example 7 and is preferred for waters open to the atmosphere where the pH tends to increase over time. The variant of this example is based upon a pH of about 4.

Example 9

| Component | Weight Percent Range |
| --- | --- |
| Sodium Persulfate | 38–52 |
| Sodium Bromide | 25–35 |
| Sodium Bisulfate | 2.7–7.6 |
| Sodium Bicarbonate | 10–28 |
| Copper Sulfate | 1–2 |

This formulation is similar to the formulation of Example 7, with sodium bromide replacing ammonium chloride as the biocide. The sodium bisulfate to sodium bicarbonate weight ratio is 0.27, and the sodium persulfate to sodium bromide weight ratio is 1.48. The composition is based upon a pH of about 7.

Example 10

| Component | Weight Percent Range |
| --- | --- |
| Sodium Persulfate | 38–52 |
| Sodium Bromide | 25–35 |
| Sodium Bisulfate | 7.8–21 |
| Sodium Bicarbonate | 5.2–14 |
| Copper Sulfate | 1–2 |

This formulation is an acidic variant of the formulation of Example 9. The sodium bisulfate to sodium bicarbonate weight ratio becomes 1.5, while the sodium persulfate to sodium bromide weight ratio remains 1.48. Again, the acidic variant is preferred for water systems open to the atmosphere that have a tendency to increase pH over time. This composition is based upon a pH of about 4.

Example 11

| Component | Weight Percent Range |
| --- | --- |
| Sodium Persulfate | 56–61 |
| Ammonium Chloride | 20–22 |
| Sodium Bisulfate | 3.3–4.6 |
| Sodium Bicarbonate | 12.2–17 |
| Copper Citrate | 1.5–2 |

In this formulation, the weight ratio of sodium persulfate to ammonium chloride is 2.8, and the weight ratio of sodium bisulfate to sodium bicarbonate is 0.27. Copper citrate is substituted for copper sulphate as an algicide. Copper citrate is a preferred algicide because it is less sensitive to pH and total alkalinity than copper sulphate, the chelating effect of citrate prevents $Cu^{2+}$ from recipitating, algae control is comparable to copper sulphate, copper citrate has a greater potential for eliminating discoloration, and citrate is biodegradable when the $pH \leq 6.1$. Copper citrate may be formed in-situ by adding copper sulfate and sodium citrate together in the composition in a 1:1 molar ratio. This formulation is based upon a pH of about 7.

Example 12

| Component | Weight Percent Range |
| --- | --- |
| Sodium Persulfate | 38–50 |
| Sodium Bromide | 25–32 |
| Sodium Bisulfate | 3.5–7.5 |
| Sodium Bicarbonate | 13–27.5 |
| Copper Citrate | 1.5–2 |

The weight ratio of sodium persulfate to sodium bromide is 1.48, and the weight ratio of sodium bisulfate to sodium bicarbonate is 0.27. Copper citrate is substituted for copper sulphate as an algicide for the reasons indicated above in Example 11. This formulation is based upon a pH of about 7.

Example 13

| Component | Weight Percent |
| --- | --- |
| Sodium Persulfate | 50–61 |
| Ammonium Chloride | 18–22 |
| Sodium Bisulfate | 6–14.6 |
| Sodium Carbonate | 4.5–11.0 |
| EDTA | 4.5–14.5 |
| Aluminum Sulphate | 1–4 |
| Copper Sulphate | 1–2 |

Example 14

| Component | Weight Percent Range |
| --- | --- |
| Sodium Persulfate | 50–64 |
| Ammonium Chloride | 18–23 |
| Sodium Bisulfate | 6.9–17.8 |
| Sodium Carbonate | 5.1–13.2 |
| Copper Sulphate | 1–2 |

Example 15

| Component | Weight Percent Range |
| --- | --- |
| Sodium Persulfate | 38–52 |
| Sodium Bromide | 25–35 |
| Sodium Bisulfate | 6.3–20.6 |
| Sodium Carbonate | 4.7–15.4 |
| Copper Sulphate | 1–2 |

In examples 13, 14, and 15, sodium carbonate is substituted for sodium bicarbonate as the basic component of the buffer compound. The weight ratio of sodium bisulfate to sodium carbonate is 1.34 for all three examples. The weight ratio of sodium persulfate to ammonium chloride is 2.8, and the weight ratio of sodium persulfate to sodium bromide is 1.48. These three examples are based upon a pH of about 7.

In the following examples, the pH effect on water of various formulations of the balanced water purification composition was compared to Baquacil™, commercially available from Zenneca, Ltd., and Chlor-Free™, commercially available from Aqua-Pure International.

Example 16

In this example unbuffered tap water having a pH 7.21, temperature of 22.9° C., and total alkalinity of 60 ppm was used in an open system. The total hardness of the water was adjusted to 208 ppm by adding $CaCl_2$, $[Cl_2]<0.5$ ppm.

The three samples of the balanced water purification composition were:
Sample 1: 57.4% $Na_2S_2O_8$, 20.5% $NH_4Cl$, 4.7% $NaHSO_4$, 17.4% $NaHCO_3$, where the weight ratio of $NaHSO_4/NaHCO_3$ was 0.27.
Sample 2: 58% $Na_2S_2O_8$, 20.7% $NH_4Cl$, 13.5% $NaHSO_4$, 7.8% $NaHCO_3$, where the weight ratio of $NaHSO_4/NaHCO_3$ was 1.7.
Sample 3: 58.0% $Na_2S_2O_8$, 20.7% $NH_4Cl$, 16.1% $NaHSO_4$, 5.2% $NaHCO_3$, where the weight ratio of $NaHSO_4/NaHCO_3$ was 3.1.

The results are listed in Table 1.

TABLE 1 pH Measured In Open System

| Day 1 Sample | pH | Temp (° C.) | T.A. (ppm) | Day 2 a.m. pH | Temp (° C.) |
| --- | --- | --- | --- | --- | --- |
| Sample 1 (.001%) | 7.21 | 23.2 | 60 | 7.84 | 22.9 |
| Sample 2 (.001%) | 7.21 | 23.1 | 60 | 7.82 | 23 |
| Sample 3 (.001%) | 7.17 | 23.3 | 60 | 7.81 | 22.7 |
| Chlor-Free ™ (.001%) | 7.19 | 23.1 | 60 | 7.83 | 22.9 |
| Chlor-Free ™ (.00037%) | 7.25 | 23.1 | 60 | 7.87 | 23 |
| BAQUACIL ™ (50 ppm) | 7.38 | 23.2 | 50 | 7.96 | 22.8 |
| Tap Water | 7.21 | 22.9 | 60 | 7.87 | 23 |

The concentrations are based on a dosage of 500 grams of product to 50,000 liters of water. The tap water was equilibrated at room temperature prior to use in these pH experiments and was unstirred. The water was not equilibrated with respect to dissolved $CO_2$. The pH was measured on day 1 after addition of the composition and on the next day, day 2. As can be seen in the table, the addition of the balanced water purification composition did not have an effect on the initial, or time zero, pH of the water with the exception of the most acidic variant, sample number 3. The other products did change the pH of the tap water upon addition.

Example 17

In this example equilibrated unbuffered tap water was stirred overnight to release $CO_2$. After overnight stirring, the pH of the water was 7.78 at a temperature of 21.8° C. and a total alkalinity of 60 ppm. Total hardness was adjusted to 272 ppm by the addition of $CaCl_2$, $[Cl_2]<0.5$ ppm.

The following samples of the balanced water purification composition were used.
Sample A: 58.6% $Na_2S_2O_8$, 21% $NH_4Cl$, 12.6% $NaHSO_4$, 7.8% $NaHCO_3$, where the weight ratio of $NaHSO_4$ to $NaHCO_3$ was 1.6.
Sample B: 56% $Na_2S_2O_8$, 20% $NH_4Cl$, 11.7% $NaHSO_4$, 7.8% $NaHCO_3$, 3% $Na_3$Citrate 1.5% $CuSO_4$, where the weight ratio of $NaHSO_4$ to $NaHCO_3$ was 1.5.

The results are listed in Table 2.

TABLE 2 pH Measured In Open System

| Day 1 Sample | pH | Temp (° C.) | T.A. (ppm) | Day 2 a.m. pH | Temp (° C.) |
| --- | --- | --- | --- | --- | --- |
| Sample A (.001%) | 7.76 | 23.2 | 60 | 7.74 | 22.6 |
| Chlor-Free ™ (.001%) | 7.50 | 23.0 | 60 | 7.59 | 23.2 |
| Sample B (.001%) | 7.66 | 23.2 | 60 | 7.70 | 23.4 |
| Tap Water (.001%) | 7.78 | 21.8 | 60 | 7.76 | 23.4 |

Again, the pH was measured after addition of the composition on day 1 and the next day, day 2. As the table illustrates, little or no change in the pH is exhibited upon the addition of the balanced water purification composition, especially when compared to the Chlor-Free™.

Example 18

The stability and higher solubility of the copper citrate algicide versus copper sulfate was demonstrated across varying pH and total alkalinity. The actual measurements were made at higher concentrations to amplify the response of the aqueous solutions. The concentrations of both the copper citrate and copper sulfate were 0.0025 M. The greater stability of copper citrate with respect to varying total alkalinity is shown in Table 3. The greater stability of copper citrate with respect to varying pH is shown in Table 4.

TABLE 3

Variable Total Alkalinity

| T.A. (ppm) | pH | Temp (° C.) | $CuSO_4$ | Cu Citrate |
|---|---|---|---|---|
| 700 | 7.73 | 23.8 | cloudy | clear |
| 450 | 7.71 | 23.8 | cloudy | clear |
| 280 | 7.81 | 24.0 | cloudy | clear |
| 150 | 7.61 | 23.6 | cloudy | clear |
| 80 | 7.75 | 23.9 | cloudy | clear |

TABLE 4

Variable pH

| pH | Temp (° C.) | $CuSO_4$ | Cu Citrate |
|---|---|---|---|
| 4 | 23.8 | clear | clear |
| 7 | 23.8 | clear | clear |
| 10 | 24.0 | cloudy | clear |

A formulation of the balanced water purification composition containing copper citrate as the algicide was also compared to Chlor-Free™ for stability. The results are listed in Table 5.

TABLE 5

Comparison to Chlor-Free ™

| T.A. (ppm) | pH | Temp (° C.) | Chlor-Free ™ | Formulation containing Cu Citrate |
|---|---|---|---|---|
| 600 | 7.62 | 23.9 | cloudy | clear |
| 350 | 7.54 | 24.6 | cloudy | clear |
| 220 | 7.64 | 24.4 | slightly cloudy | clear |
| 110 | 7.59 | 24.1 | clear | clear |
| 65 | 7.59 | 24.0 | clear | clear |

1) Formulation containing copper citrate: 56% $Na_2S_2O_8$, 20% $NH_4Cl$, 11.7% $NaHSO_4$, 7.8% $NaHCO_3$, 3% Sodium Citrate, and 1.5% $CuSO_4$
2) Concentration of the Chlor-Free ™ Commercial product and the formulation containing copper citrate products are 2 mg/mL (200 times concentrated than the dosage used in regular swimming pools).

The concentrated copper citrate solution (0.0025 M) and the formulation of the balanced water purification composition containing copper citrate have a wide range of tolerance toward pH (4–10) and total alkalinity (0–700 ppm), whereas the copper sulfate solution (0.0025 M) and the Chlor-Free™ commercial product containing copper sulfate are more pH and alkalinity sensitive and precipitate out at high pH or high alkalinity depending on the copper concentration.

The foregoing examples are meant as an illustration of the balanced water purification composition only and not as a limitation. Those of ordinary skill in the art of water treatment will readily recognize that many variations of the balanced water purification composition are possible and are likely to be an effective water treatment composition.

What is claimed is:

1. A method for making a balanced water purification system to be used in conjunction with existing water treating without changing the pH of the water to which it is added, comprising:
    a) determining the pH and temperature range of the water to be treated;
    b) preparing a balanced water treatment composition by:
        i) formulating a buffer compound having an acidic component and a basic component present in a molar ratio equivalent to the pH of the water to be treated;
        ii) adding a sufficient amount of a biocide compound to inactivate the biological contaminants in the water; and
        iii) adding a sufficient amount of a clarifier/oxidizer compound to oxidize the biocide compound completely and to oxidize organic matter in the water; and
    c) placing the balanced water treatment composition in a plurality of packets.

2. The method of claim 1 wherein no one of said plurality of packets comprises all of the compounds of the composition.

3. The method of claim 2 wherein the biocide compound and the oxidizer/clarifier compound are held in different packets.

4. The method of claim 3 wherein said plurality of packets comprises a first packet comprising the biocide compound and a second packet comprising the oxidizer compound.

5. The method of claim 4, wherein the first packet further comprises the basic component of the buffer compound, and the second packet further comprises the acidic component of the buffer compound.

6. A balanced water purification system for addition to, and purification of, water independently maintained at a predetermined pH and having a certain temperature range without changing the pH of the water, comprising:
    a) a balanced water purification composition, comprising:
        i) a buffer compound comprising:
            A) an acidic component; and,
            B) a basic component, wherein the acidic and the basic components are each present in an amount sufficient to provide a molar ratio of the acidic component to the basic component that yields a buffer compound having pH in solution equivalent to the existing pH of the water to be purified;
        ii) a biocide compound present in an amount sufficient to inactivate biological contaminants in the water to be purified; and
        iii) an oxidizer/clarifier compound present in an amount sufficient to oxidize the biocide compound completely; and
    b) a plurality of packets for holding the composition.

7. The balanced water purification system of claim 6 wherein no one of said plurality of packets comprises all of the compounds of the composition.

8. The balanced water purification system of claim 7 wherein the biocide compound and the oxidizer/clarifier compound are held in different packets.

9. The balanced water purification system of claim 8, wherein said plurality of packets comprises a first packet comprising the biocide compound and a second packet comprising the oxidizer compound.

10. The balanced water purification system of claim 9, wherein the first packet further comprises the basic component of the buffer compound, and the second packet further comprises the acidic component of the buffer compound.

11. The balanced water purification system of claim 10 wherein the plurality of packets comprises exactly two packets.

12. The balanced water purification system of claim 10 wherein the packets comprise water soluble film bags.

13. The balanced water purification system of claim 12 wherein the water soluble film bags comprise polyvinyl alcohol, a cellulosic polymer, or polyethylene oxide.

14. The balanced water purification system of claim 6 wherein said acidic component is sodium bisulfate, said basic component is sodium bicarbonate and the molar ratio of sodium bisulfate to sodium bicarbonate is about 0.26 to about 0.14, corresponding to said buffer compound pH in solution from about 6.8 to about 7.2.

15. The balanced water purification system of claim 6, wherein said biocide compound is ammonium chloride, ammonium bromide, or sodium bromide.

16. The balanced water purification system of claim 6, wherein said oxidizer/clarifier compound is a peroxide, alkali metal perborate, or alkali metal persulfate.

17. The balanced water purification system of claim 6, further comprising an algicide.

18. The balanced water purification system of claim 6, further comprising a chelating agent.

19. The balanced water purification system of claim 6, further comprising a calcium releasing compound, a scale inhibitor, or a sequestering agent.

20. The balanced water purification system of claim 6, further comprising a filtration aid.

* * * * *